Feb. 7, 1961 P. H. SNOBERGER 2,971,070
REFRIGERATOR COMPRESSOR CONTROL
Filed Aug. 4, 1958 7 Sheets-Sheet 1

Feb. 7, 1961   P. H. SNOBERGER   2,971,070
REFRIGERATOR COMPRESSOR CONTROL
Filed Aug. 4, 1958   7 Sheets-Sheet 4
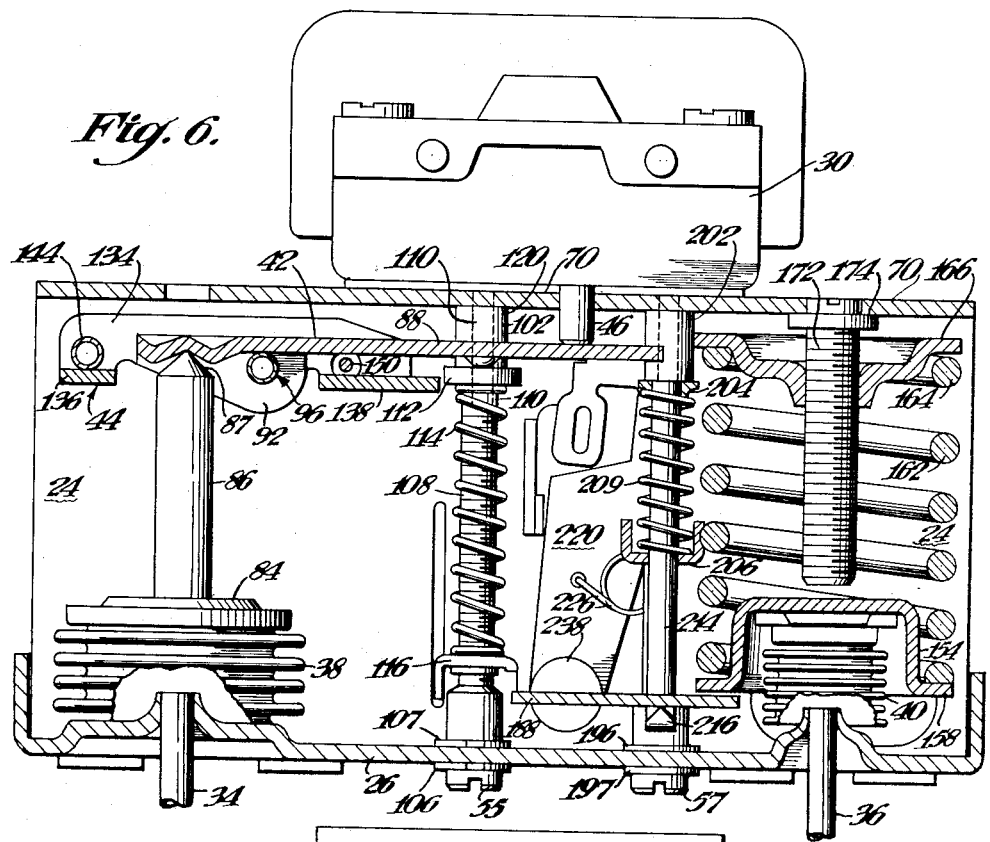
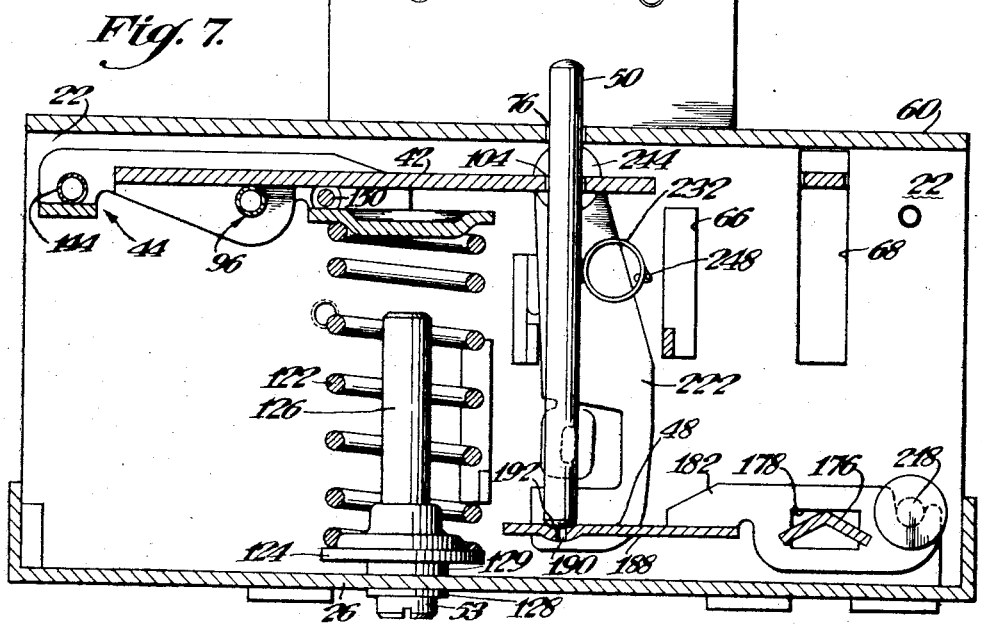

Feb. 7, 1961     P. H. SNOBERGER     2,971,070
REFRIGERATOR COMPRESSOR CONTROL
Filed Aug. 4, 1958     7 Sheets-Sheet 5

Feb. 7, 1961 P. H. SNOBERGER 2,971,070
REFRIGERATOR COMPRESSOR CONTROL
Filed Aug. 4, 1958 7 Sheets-Sheet 6

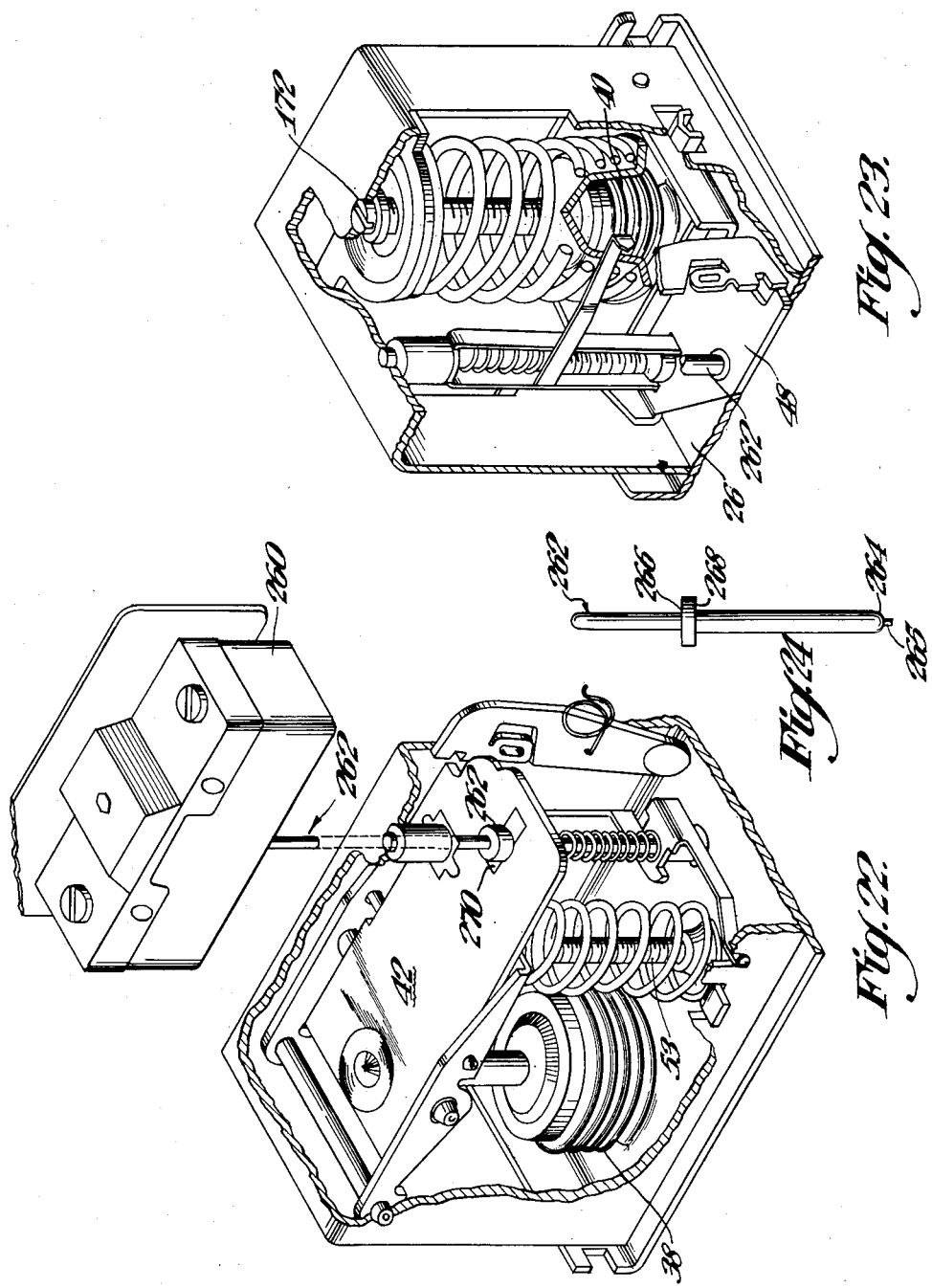

United States Patent Office 2,971,070
Patented Feb. 7, 1961

2,971,070

REFRIGERATOR COMPRESSOR CONTROL

Philip H. Snoberger, Pittsford, N.Y., assignor to Robertshaw-Fulton Controls Company, Richmond, Va., a corporation of Delaware Filed Aug. 4, 1958, Ser. No. 752,999

13 Claims. (Cl. 200—83)

This invention relates to pressure sensitive controls for refrigeration systems.

Refrigeration equipment basically includes an evaporator, a compressor, a condenser, an expansion valve and, as well, certain other components and controls which are unimportant to the present invention. The evaporator is generally termed the low pressure side of the system since the refrigerant is in a gaseous state under low pressure. The heat transfer between the air to be cooled and the evaporating refrigerant when in its low pressure condition causes a cooling of the air and a heating of the refrigerant. At the condenser side of the system the refrigerant is pumped by the compressor to be under a high pressure and condenses back into a liquid state at a relatively high temperature. The heat of the refrigerant when under pressure is removed through a second heat exchanger called the condenser in the usual terminology.

It is customary with such refrigeration systems to have pressure controls for monitoring the pressure on the high side of the system since it is necessary to prevent the pressure from exceeding the rated pressures of the vessels, and also for monitoring the low pressure on the evaporator side of the system to detect whether the refrigerant is returning to the compressor since loss of refrigerant can cause serious damage by overheating. The high pressure and low pressure monitoring controls are used as safety devices to assure that electrical power to the compressor motor is removed when either the pressure on the high side exceeds a predetermined value or the pressure on the low side becomes less than a predetermined value.

In some prior systems, the control for the low side of the refrigerating system has been used as an operating element for cycling the refrigerator compressor on and off. The low pressure control in such installations has been arranged to shut down operation of the compressor at a first low pressure and start up operation of the compressor at some higher pressure. Such a control system has been used primarily in commercial and domestic refrigeration systems of the walk-in type where the heat gain is a relatively constant value. In such a system no thermostat is required and the control merely cycles the refrigeration unit between a minimum pressure, for example a pressure which provides 35° at the evaporator and a maximum pressure, for example a pressure which provides 50° at the evaporator, to provide an average mean temperature of 42°.

The difference between the high cut-in temperature and the low cut-out temperature for a control of this type is termed the operating differential. In most installations where the control unit is used to start and stop operation of the compressor motor, it is preferred that the operating differential of the control be variable so that it can be adjusted to the desired temperature range. It is also desirable for commercial applications that the pressure at which the compressor motor is turned on or turned off be made adjustable so that the average temperature can be regulated.

In prior refrigeration control units of the type to which the present invention relates, the high side pressure has been used principally as a safety control. Where a high side differential operating pressure is provided, the control causes the compressor to function in a manner similar to that of the limit control on a furnace and in effect operates to limit the capacity of the unit.

It is accordingly a major object of this invention to provide a novel control unit of the foregoing type which permits the operation of the compressor to be controlled from both the low pressure side and the high pressure side. The novel control unit of this invention is also characterized by its compact size made possible by the novel arrangement of components.

It is a further object of this invention to provide a novel lever arrangement providing for both range and differential adjustments. The lever arrangements according to one embodiment are so arranged that one electric switch can be controlled by both the high and low pressure sides of the control unit through a single switch actuating member, or in other embodiments separate electric switches can be used for each the low pressure side and the high pressure side.

A further feature normally found on control units of the foregoing type is a lock-out and reset device where the control unit is not used as a thermostat. The lockout is conventionally used to prevent further operation of the system once an operating pressure has exceeded the limit set on the control unit. The reset device ordinarily operates in a manner to release the lock-out and close switch contacts to apply power to the compressor motor.

Another important object of this invention is to provide a novel lock-out mechanism which operates independently on each side of the control unit and a novel reset bar which acts only on the lock-out mechanism so that power is not reapplied to the compressor motor when the reset bar is manually depressed unless the dangerous condition causing the lock-out mechanism to operate has been corrected.

These and other objects of the invention will be apparent from the appended claims and the following detailed description when read in conjunction with the accompanying drawings, wherein:

Figure 2:
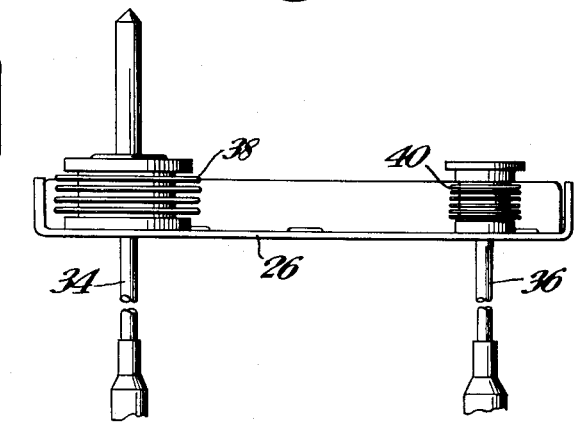
Figure 2 is an elevation view of the base and bellows assembled as a unit.
Figure 3:
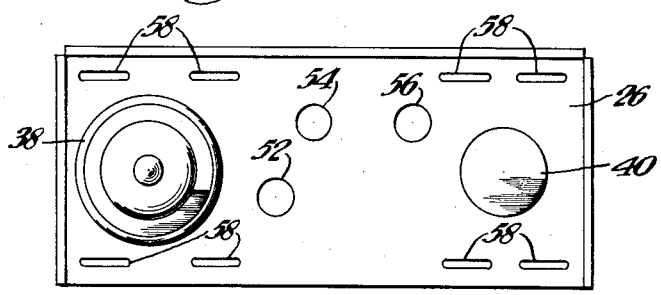
Figure 3 is a top plan view of the base and bellows unit of Figure 2.
Figure 4:
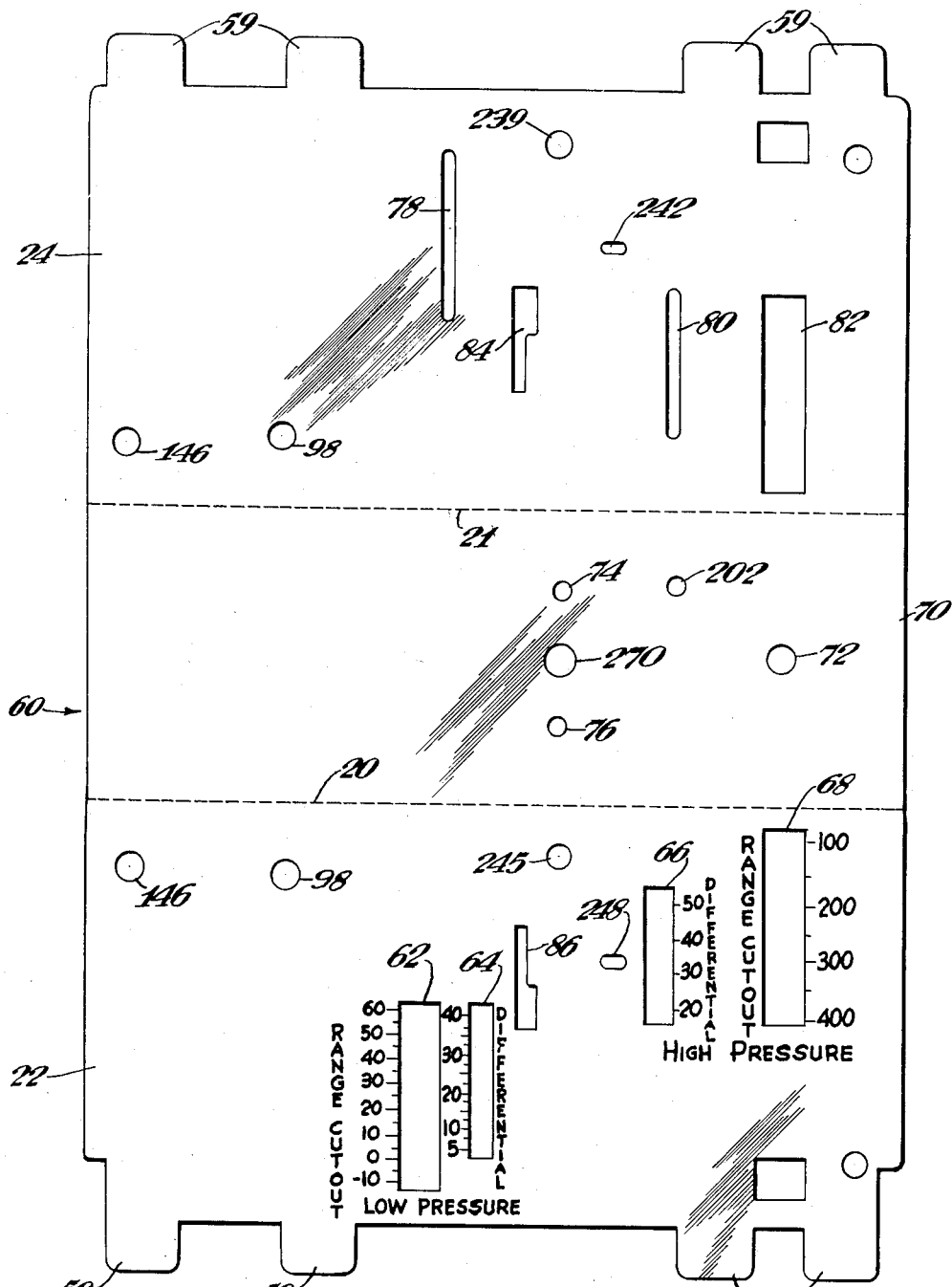
Figure 5:
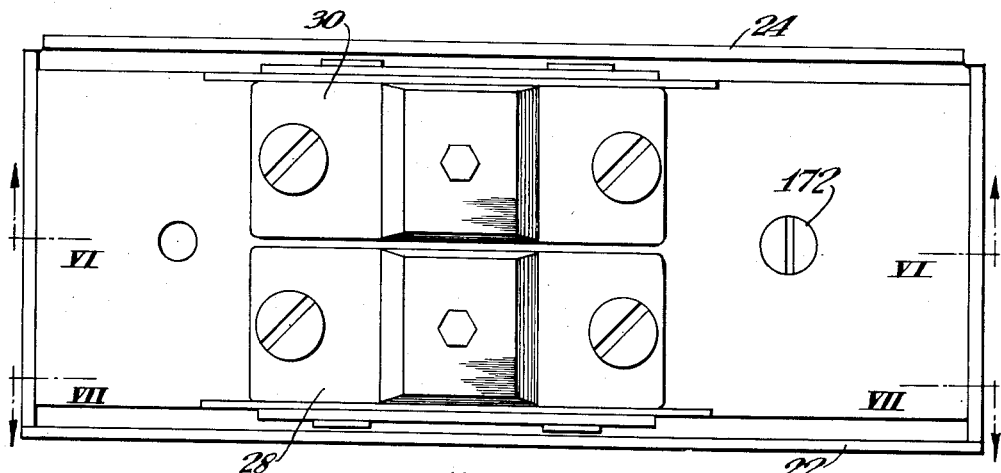
Figure 16:
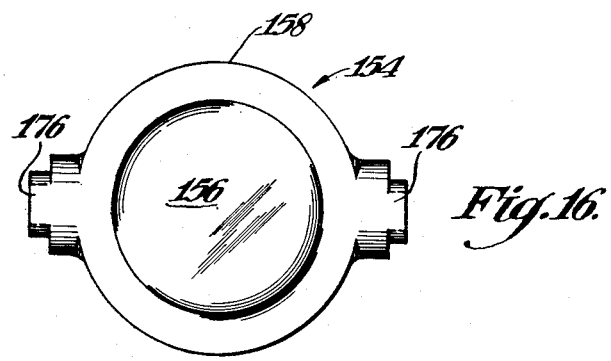
Figure 17:
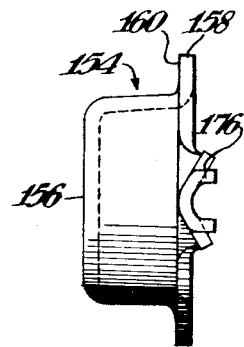
Figure 21:
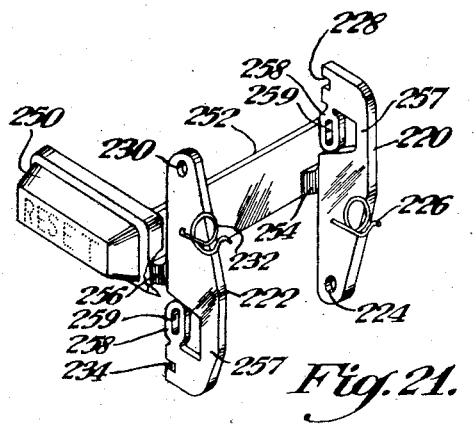
Figure 9:
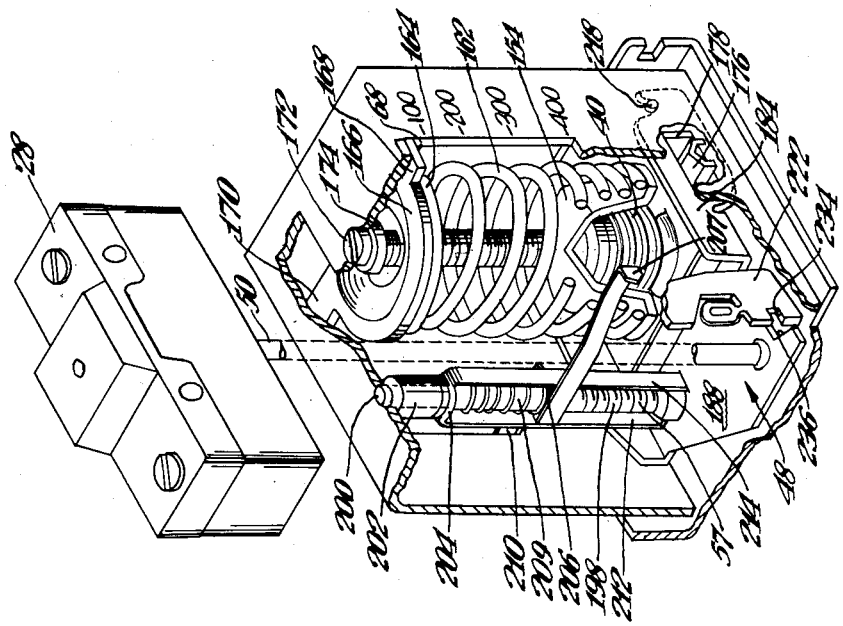
Figure 8:
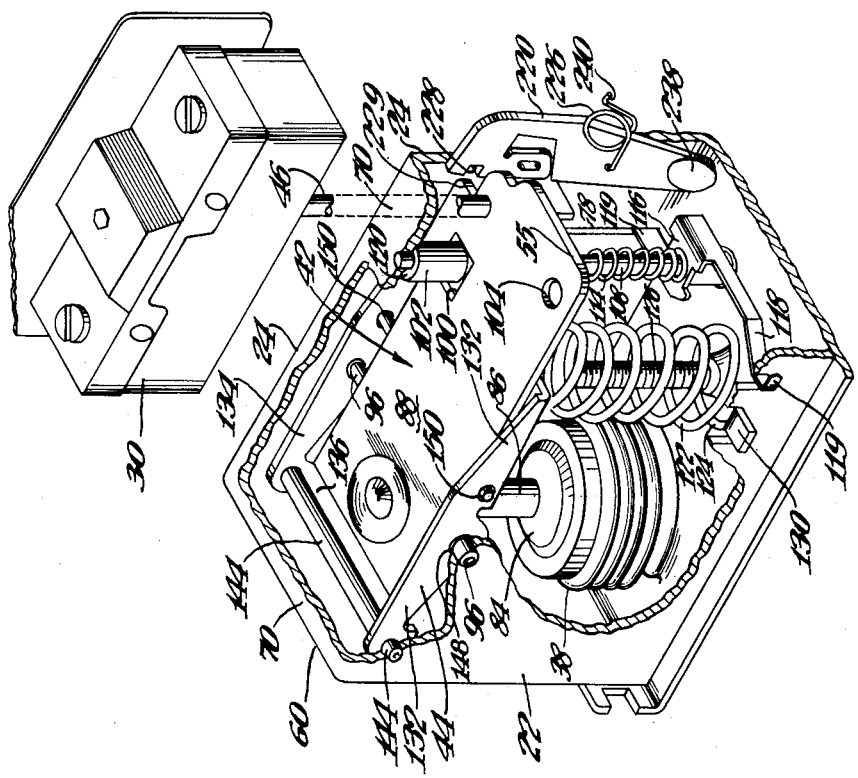
Figure 18:
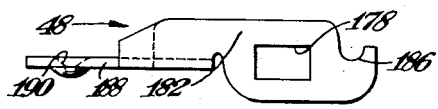
Figure 20:
Figure 19:
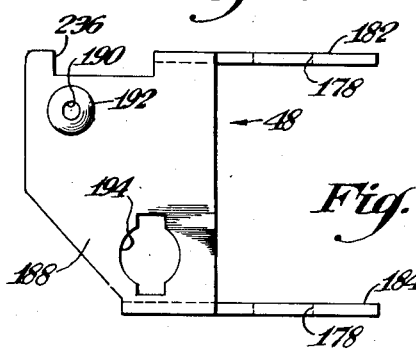
Figure 14:
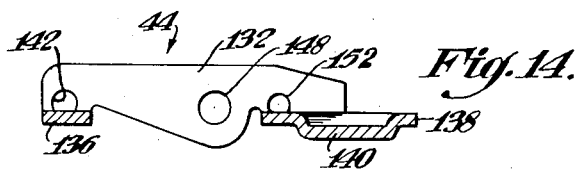
Figure 15:
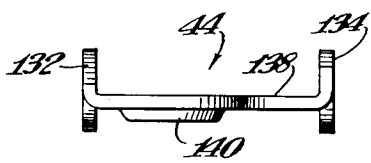
Figure 13:
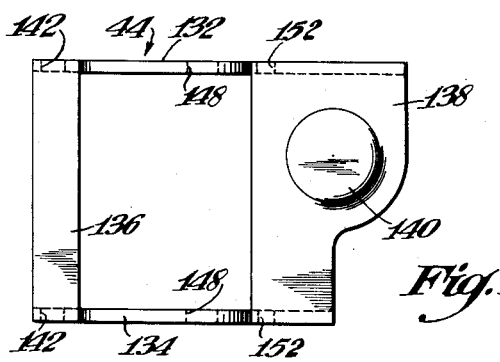
Figure 11:
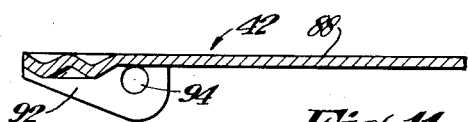
Figure 12:
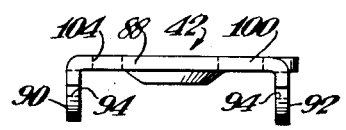
Figure 10:
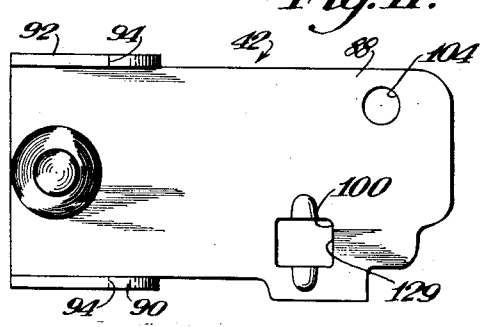

Figure 4 is a layout view of the control casing which when assembled is bent along lines 20 and 21 at right angles to be substantially U shaped with sides 22 and 24 parallel and with the tabs on the bottom edges fitting in the slots along opposite sides of base 26 shown in Figures 2 and 3;

Figure 5 is a top view of the casing of Figure 4 showing electric switches 28 and 30;

Figure 6 is an elevation view in section taken along line 6—6 of Figure 5;

Figure 7 is an elevation view in section taken along line 7—7 of Figure 5;

Figure 8 is a perspective view of the low side of the control unit of the present invention with part of the casing removed to show the interior assembly;

Figure 9 is a perspective view of the high pressure side of the control unit of the present invention with part of the casing broken away to show the interior assembly of components;

Figure 10 is a bottom plan view of the principal low pressure bellows lever;

Figure 11 is a front elevation view in section of the principal low pressure bellows lever of Figure 10;

Figure 12 is an end elevation view of the principal low pressure bellows lever of Figure 10;

Figure 13 is a bottom plan view of the auxiliary lever for low side pressure bellows;

Figure 14 is a front elevation view in section of the auxiliary low pressure lever taken along lines 14—14 of Figure 13;

Figure 15 is an end elevation view of the auxiliary lever for the low pressure side shown in Figure 13;

Figure 16 is a top plan view of saddle for the high pressure bellows unit;

Figure 17 is a front elevation view of the saddle of Figure 16;

Figure 18 is a front elevation view of the high pressure lever for transmitting motion from the high pressure bellows to the high pressure switch actuator rod;

Figure 19 is a bottom plan view of the high pressure lever of Figure 18;

Figure 20 is a side elevation view of the high pressure lever of Figure 18;

Figure 21 is a perspective view of the lock-out mechanism and reset device for the control unit of the present invention;

Figures 22 and 23 are views similar to Figures 8 and 9 of a modified form of the control shown in Figures 1–20 wherein only one electrical switch is provided on the control to be actuated by either the low pressure bellows or the high pressure bellows; and Figure 24 is a view of the switch actuating push rod used in the embodiment shown in Figures 22 and 23.

Figure 1:
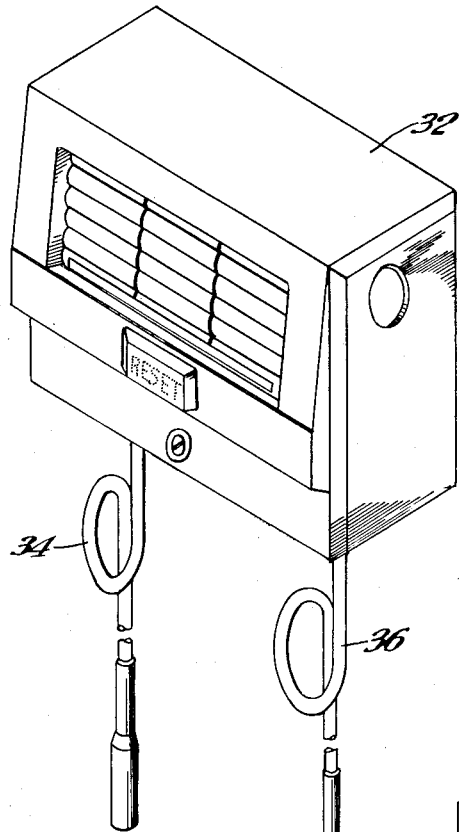
Figure 1 is a perspective view of the control of the present invention.

Referring to Figure 1, the control device of the present invention is provided with a removable housing 32 covering the internal components and mounted over base 26 shown in Figures 2 and 3. A low pressure tube 34 and a high pressure tube 36 extend from the lower side of base 26 and are in fluid communication with low pressure bellows 38 and high pressure bellows 40 respectively. The conventional operation of the control device of this type is for the displacement of the upper ends of the bellows units 38 and 40 to operate electrical switches which in turn control the electrical power supplied to the compressor motor.

In the control device of the present invention, the mechanical movement of low pressure bellows 38 caused by the change in pressure applied through tube 34 is transmitted through a novel mechanical linkage including the principal low pressure bellows lever 42 (see Figure 8), and push rod 46 to snap acting switch 30 which may be of the general type well known in the art. The mechanical movement of the high pressure bellows 40 caused by the change in pressure applied through tube 36 is transmitted through a novel mechanical linkage including high pressure bellows lever 48 and push rod 50 to snap acting switch 28 which is substantially identical to switch 30.

The snap acting switches 28 and 30 as manufactured commercially have normally closed switch contacts and require push rods 46 and 50 to have displacement of the order of 0.016 inch for a complete cycle of actuation. Switch actuating push rods 46 and 50 therefore must be displaced upwardly from a neutral position 0.008 inch to cause the contacts of the respective microswitches to open, and move downwardly 0.008 inch from the neutral position to cause the contacts of the microswitch to close after being open. The operating differential of the control device of the present invention is thus dependent inherently upon the operating differential displacement of the microswitches 28 and 30.

The present invention provides means to vary the operating differential by adjustably and variably loading levers 42 and 48 during their movement below the neutral position corresponding to the neutral position of the snap acting switch to the switch closing position which occurs as push rods 46 and 50 move downwardly. Since this loading on levers 42 and 48 is effective only in positions below the neutral position, the differential adjustment has no influence on the pressures at which the contacts in switches 28 and 30 open.

To provide a range adjustment which is effective to control the opening of the contacts of the microswitches 28 and 30 to correspond with the predetermined pressure in the corresponding bellows units, there is further provided a range adjustment spring, one for the low pressure side and one for the high pressure side, which acts in opposition to the force supplied by the respective bellows to adjustably and variably load levers 42 and 48. By varying the compression of the range adjustment springs through range adjustment screws, the range of pressures which cause actuation of microswitches 28 and 30 is controlled.

It will be appreciated by those skilled in this art that the foregoing requirements impose strict design limitations which render it very difficult to provide a unit of small size as is demanded in specialized refrigeration applications. The forces that can be obtained from a bellows unit connected to refrigeration apparatus pressures are limited so that the spring constants and hence spring sizes, must be so chosen as to provide a satisfactory operation. By the unique arrangement of levers in the control device of the present invention, the spring sizes have been kept small thereby making possible a novel control of smaller over-all size than has heretofore been possible. The outside dimensions of the control device illustrated are approximately 4½ inches wide, 3½ inches high and 2 inches deep.

Referring now to Figure 3, base 26 is provided with three apertures including aperture 52 which receives the low pressure range adjustment screw 53, aperture 54 which receives the low pressure differential adjustment screw 55, and aperture 56 which receives the high pressure differential screw 57. Slots 58 are provided in base 26 to receive ears 59 in casing 60 shown in Figure 4.

Casing 60 shown in Figure 4 is bent at right angles along dotted lines 20 and 21 to form an inverted U-shaped housing with surfaces 22 and 24 parallel. On front surface 22 a slot 62 is provided with indicia of pressure adjacent one edge for indicating the low pressure range adjustment setting. Slot 64 is provided for receiving the index marker for the low pressure range differential adjustment. Slot 66 is provided for receiving the index marker on the high pressure differential adjustment device and slot 68 is provided for the index marker of the high pressure range adjustment mechanism. On top surface 70 an aperture 72 is provided to make the high pressure range adjustment screw accessible.

Upper surface 70 of the casing is also provided with aperture 74 through which push rod 46 for the low pressure microswitch 30 passes and aperture 76 through which push rod 50 passes for high pressure microswitch 28. Slots 78, 80 and 82 on rear surface 24 of the casing member serve as guides for the low pressure differential adjustment nut 116 (see Figure 8), the high pressure differential adjustment nut 206 (see Figure 9), and the high pressure range adjustment nut 166 (see Figure 9) respectively. Slot 84 on rear surface 24 and slot 86 on front surface 22 are suitably shaped to receive the reset bar 252 shown in detail in Figure 21.

In Figure 5 the casing of Figure 4 is shown mounted on base 26 of Figures 2 and 3. Microswitches 28 and 30 are secured by suitable fasteners (not shown) to the upper surface 70 of casing 60.

Referring now to Figures 6, 7, 8 and 9, and in particular to Figures 6 and 8, low pressure bellows 38 has an upper cap 84 having a central cylindrical depression to support the lower end of a cylindrical metal rod 86 which has a pointed upper end 87 contacting the principal low pressure bellows lever 42. The principal low pressure bellows lever 42, shown in detail in Figures 10, 11 and 12, comprises a generally flat body 88 with ears 90 and 92 depending at right angles from each side with each ear having aligned apertures 94 for receiving pin 96 shown in Figure 8 which is journalled in apertures 98 of the front wall 22 and rear wall 24 of the casing member shown in Figure 4.

Aperture 100 in the flat body 88 of lever 42 is in alignment with the differential adjustment screw 55 which terminates at its upper end in bushing 102 shown in Figures 6 and 8. A further aperture 104 is provided in surface 88 of low pressure bellows lever 42 which is sufficiently large so that push rod 50 for the high pressure side of the control passes freely through low pressure lever 42.

The low pressure differential adjustment means comprises adjustment screw 55 which is suitably supported through aperture 54 in base 26 as by split ring washers 106 and 107 on opposite sides of base 26. Adjustment screw 55 contains a threaded portion 108 terminating in a reduced diameter end section 110 which extends through bushing 102. Bushing 102 has an enlarged head 112 which is sufficiently larger than aperture 100 in bellows lever 42 so that as body 88 moves downwardly in a clockwise direction about pin 96 as viewed in Figures 6 and 8 bushing 102 is forced downwardly against differential adjustment spring 114 which surrounds threaded portion 108 of the differential adjustment screw 55. Nut 116 is threadedly received on portion 108 of differential adjustment screw 55 and carries an index arm 118 having pointer 119 which cooperates with the scale calibration marks adjacent slot 64 in the front surface 22 of housing 60 shown in Figure 4. A second arm 119 is also formed on nut 116 to cooperate with the side walls of slot 78 in rear surface 24 of casing 60 whereby nut 116 is free to move upwardly from the position shown as differential adjustment screw 55 is turned. As is clearly shown in Figure 6, the force provided by differential adjustment spring 114 acts through bushing 102 on bellows lever 42 at a position to be in opposition to the force applied by low pressure bellows 38 through rod 86.

The upper surface 120 of bushing 102 abuts against the upper part 70 of casing 60 when lever 42 is in a position corresponding to or higher than the neutral position of microswitch 30 and aperture 100 is of a size sufficiently larger than the diameter of bushing 102 so that low pressure bellows lever 42 moves upwardly to be free from bushing 102 as lever 42 pivots counterclockwise about pin 96 and forces push rod 46 upwardly to open the contacts in microswitch 30. It is only during the switch closing operation that the differential range spring 114 becomes effective which is when bellows lever 42 is below the position corresponding to the neutral position of the microswitch 30 that the lower surface of body 88 contacts bushing head 112. As the pressure in bellows 38 increases further, thereby causing lever 42 to pivot clockwise about pin 96 as viewed in Figs. 6 and 8, the force necessary to compress differential spring 114 must be overcome before push rod 46 lowers sufficiently to permit the contacts on microswitch 30 to again close. From the foregoing it is apparent that the differential adjustment spring 114 has no influence on the pressure in bellows 38 which causes the contacts in microswitch 30 to open. The effect of differential adjustment spring 114 is used solely to control the pressure at which the contacts on microswitch 30 close by adding an incremental force adjustable in magnitude to provide the variable operating differential.

Referring now also to Fig. 7, the low pressure range spring 122 is supported on its lower end by nut 124 which cooperates with the threaded portion 126 of the range adjustment screw 53. Range adjustment screw 53 is held in position in aperture 52 of base 26 as by split ring washers 128 and 129 and as best shown in Fig. 8, a range marker index 130 is provided on nut 124 to extend through slot 62 of front surface 22 on casing 60 as shown in Fig. 4. The sides of slot 62 by contact with the side edges of index 130 serve to prevent nut 124 from rotating, whereby rotation of screw 53 causes nut 124 to raise thereby compressing spring 122 and providing the principal force which opposes the force supplied by bellows 38 through rod 86.

As is most clearly shown in Figs. 7 and 8, the upper end of range spring 122 abuts against the auxiliary low pressure lever 44 which is shown in detail in Figs. 13, 14, and 15. Auxiliary lever 44 comprises two rigid side edges 132 and 134 which are bridged at one end by member 136 and at the other end by a larger section 138 which is provided with a downwardly extending boss 140 around which range spring 122 fits. Apertures 142 are provided in each of side edges 132 and 134 to receive pin 144 which fits through apertures 146 in front wall 22 and rear wall 24 of casing 60 shown in Fig. 4. Another pair of apertures 148 are provided centrally in side edges 132 and 134 to be in alignment with pin 96 which fits through apertures 94 of the main low pressure bellows lever 42 shown in Figs. 10, 11 and 12. The diameter of apertures 148 is larger than the diameter of pin 96 to permit lever 44 to rotate about the pin 144 an amount sufficient to follow lever 42 by means of a cross pin 150 during the switch action; the enlarged apertures 148 also provide a positive stop so that the range spring 122 may not apply its full force against the switch plunger whenever the lower than normal pressure situation exists.

The only contact between the main bellows lever 42 and auxiliary bellows lever 44 is through pin 150 as is apparent from Figs. 6, 7 and 8. As best shown in Figs. 13 and 14 side edges 132 and 134 of the auxiliary bellows lever 44 are provided with a further aperture 152 into which the ends of pin 150 rotatably extend. There is no corresponding aperture in the front wall 22 or rear wall 24 of casing 60 shown in Fig. 4 and pin 150, therefore, moves with auxiliary low pressure bellows lever 44 in its pivotal movement about pin 144. The upper edge of pin 150 abuts against the lower surface of body 88 of the principal low pressure bellows lever 42; thus, the rolling of pin 150 provides for lateral movement of the levers 42 and 44 as they rotate about their different axes.

In operation, the force supplied by range spring 122 acting upwardly against boss 140 on auxiliary bellows lever 44 which pivots about pin 144 is applied through pin 150 to the main bellows lever 42 and is on the opposite side of pivot pin 96 from low pressure bellows push rod 86 to act in opposition to the force applied from low pressure bellows 38 through push rod 86. If the evaporator pressure is too low, the force supplied by range spring 122 is sufficient to cause auxiliary bellows lever 44 to move counterclockwise about pin 144 and the main bellows lever 42 to pivot counterclockwise about pin 96 thereby raising push rod 46 to open the contacts in microswitch 30. In the absence of a reset device, which will be discussed below in connection with Figure 21, as the pressure in the evaporator increases, the increasing force from bellows 38 applied through rod 86 will cause the main bellows lever 42 to pivot about pin 96 in a clockwise direction thus forcing pin 150 downwardly against the auxiliary bellows lever 44 to compress range spring 122. After the main bellows lever 42 has dropped to a position corresponding to the neutral position of switch 30, the lower surface of body 88 of lever 42 contacts flange 112 on bushing 102 so that any further clockwise movement of bellows lever 42 caused by increasing evaporator pressure will have to also overcome the force supplied by the low pressure differential spring 114. If the force necessary to compress low pressure differential range spring 114 approximately 0.008 inch is small then the operating differential will be small. As nut 116 is raised and spring 114 compressed, the added force which must be supplied by low pressure bellows 38 is increased and the operating differential is thereby increased.

Thus adjustment of range screw 53 controls the cutout point or the minimum evaporator pressure at which the compressor motor will be turned off and the differential screw 55 adjusts the differential spring 114 to control the evaporator pressure corresponding to a high temperature where the contacts in microswitch 30 will close to permit the compressor motor to be energized.

By this arrangement of parts it is possible to provide a variable operating differential adjustment in a smaller housing without interfering with the operation of the high pressure components in the control housing. One important arrangement which directly results in the smaller size is the use of two low pressure levers which permits a favorable mechanical advantage to be obtained so that the low pressure range spring 122 acts in parallel with low pressure bellows 38 rather than in an end to end position which has been generally used heretoforce.

Referring now to Figures 6 and 9, the high pressure bellows 40 has its upper free end extending into an inverted cup-shaped saddle 154 shown in detail in Figures 16 and 17. Bellows saddle 154 contains an upper cup-shaped portion 156 and a lower flange 158 having surface 160 which serves as a support shoulder for the lower end of high pressure range spring 162. As clearly shown in Figures 6 and 9 the upper end 164 of high pressure range spring 162 is retained in position by a shouldered adjusting nut 166 which has an index 168 to cooperate with the indicia adjacent slot 68 of front face 22 of casing 60 shown in Figure 4. An ear 170, also integral with the high pressure range adjustment nut 166, cooperates with the edges of the slot 82 in rear surface 24 of the casing shown in Figure 4 to prevent nut 166 from rotating Nut 166 is threadedly received on the high pressure range adjusting screw 172 which is in axial alignment with the center of high pressure bellows 40. Range adjustment screw 172 has an integral flange 174 which bears against upper surface 70 of casing 60 and is retained in the position illustrated in Figures 6 and 9 by the force exerted by spring 162. The slotted head of range adjustment screw 172 is accessible through aperture 72 in upper surface 70 of the casing shown in Figure 4.

Referring again to Figures 16 and 17, saddle 154 is provided with oppositely extending ears 176 which protrude outwardly from saddle 154 to be received in slots 178 of the high pressure lever 180 shown in Figures 18, 19 and 20.

Lever 180 as shown in Figures 18–20 comprises a pair of spaced sides 182 and 184 having a semicircular arc 186 which is adapted to fit under pin 185 to serve as the axis of pivotal movement for lever 180. A generally flat transverse section 188 is provided at the opposite end of lever 180. Aperture 190 is provided in the center of recess 192 to receive the lower end of switch actuating rod 50 as is clearly shown in Figure 7. A further opening 194 is provided in section 188 which is enlarged at opposite sides to receive the lower end of the high pressure differential adjustment assembly.

Referring now to Figures 6 and 9 the high pressure differential adjustment assembly comprises adjustment screw 57 which is mounted to base 26 as with split ring washers 196 and 197 and contains a central threaded portion 198 which terminates in end section 200 of reduced diameter which extends upwardly into aperture 202 of top section 70 of casing 60 as shown in Figure 4. On reduced diameter end section 200 there is a cylindrical bushing 202. Nut 206 is centrally located along the threaded portion 198 of the differential screw 57 and contains two opposite side arms 208 and 210 which are rigidly secured to opposite side edges of nut 206. An index marker 207 is carried by arm 208 which extends into slot 66 of front face 22 of the casing shown in Figure 4. The rearwardly extending arm 210 cooperates with slot 80 in rear face 24 of casing of Figure 4 to prevent nut 206 from rotating as the adjustment screw 57 is turned.

Differential spring 212 fits on top of nut 206 and extends upwardly against the upper end of stanchion 204 which has a central bore fitting loosely over the reduced end section 200 of the differential adjustment screw 57. The upper end of stanchion 204 abuts against the lower surface of bushing 202 when high pressure lever 48 is at or above a position corresponding to the neutral position for switch 28. Stanchion 204 contains two arm sections 212 and 214 which extend parallel to and on opposite sides of the threaded portion 198 of the differential adjusting screw. The lower ends 216 of side arms 212 and 214 pass through the enlarged part of aperture 194 in section 188 of high pressure lever 48 to engage the lower side of section 188, and are bent over so that lever 48 is free to move upwardly away from the lower ends 216 to cause the contacts of microswitch 28 to open. When lever 48 moves downwardly to a position corresponding to or below the neutral position of switch 28, lower end sections 216 of stanchion 204 engage lever 48 to pull stanchion 204 downwardly and compress spring 212 against nut 206 before the contacts of microswitch 28 are permitted to close. Rotating screw 57 so that nut 206 advances upwardly causes spring 212 to compress to thereby require a greater force before lever 48 will move downwardly to the position where the contacts of microswitch 28 open. This effectively increases the operating differential of the high side of the control unit. Conversely, rotating screw 57 so that nut 206 moves the operating differential downwardly to permit spring 212 to expand decreases for the high pressure side of the control unit.

In operation tube 36 from high pressure bellows 40 is connected to the high pressure side of the refrigeration unit and the position of saddle 154 is determined by the resultant of the combined forces supplied by range spring 162 acting downwardly on saddle 154 and by high pressure bellows 140 acting upwardly on saddle 154. Saddle 154 is connected to lever 48 by ears 176 extending into aperture 178 which is mounted for pivotal movement about pin 218 (see dotted lines in Figure 7) so that as the pressure supplied to bellows 40 increases, lever 48 pivots in a clockwise direction as shown in Figure 9 about pin 218 to thereby force push rod 50 in an upward direction to cause the switch contacts in microswitch 28 to open. By turning range screw 72 so that nut 166 lowers to compress range spring 162, a higher operating pressure in bellows 40 is required before the switch contacts of microswitch 28 open.

When the contacts of microswitch 28 are open, section 188 of lever 48 is above the lower end 216 of stanchion 204, and it is only when section 188 drops to a position coresponding to the neutral position of the microswitch 28 to contact lower end 216 of stanchion 204 that lower end 216 of tanchion 204 contacts lever 48 to become operative. Further reduction in pressure must be applied to bellows 40 to pull stanchion 204 downwardly against the force supplied by differential spring 212 before the microswitch contacts close. Thus, the difference in pressure between the value which causes the microswitch contacts to open as the pressure increases and the pressure at which lever 48 is permitted to drop to the position where contacts in microswitch 28 close is controlled by the force supplied by differential spring 212.

Referring now to Figure 21 there is illustrated the lock-out mechanism and reset device adapted to be used in the control according to the present invention. The lock-out and reset device is an optional feature since in installations where the control is to be used for cycling the refrigeration equipment on and off in accordance with the temperature in the confined enclosure, the lock-out device would not be used. The lock-out device of Figure 21 is effective, when used, to retain open whichever of the microswitches 28 or 30 that is in an opened condition by locking the corresponding low pressure lever 42 or the high pressure lever 48 in a position holding the microswitch contacts open.

The lock-out mechanism of Figure 21 comprises a low pressure lock-out lever 220 (see also Figures 6 and 8) and a high pressure lock-out lever 222 (see also Figure 7) which operate independently of each other. Low pressure lock-out lever 220 has a pivot aperture 224, a spring 226 and a slot 228 for engaging low pressure lever 42 at recessed edge 229 shown in Figure 12. The high pressure lock-out lever 222 is substantially identical to the low pressure lock-out lever 220 and has a pivot aperture 230 at one end, spring 232, and a slot 235 adapted to engage the high pressure lever 48 at surface 236 shown in Figures 7 and 9.

As best shown in Figures 6 and 8, the low pressure lock-out lever 220 is mounted on rear wall 24 of the casing by pin 238. The free end 240 of spring 226 fits into a suitable aperture 242 in the rear wall 24 of casing 60 as shown in Figure 4. Spring 240 urges the low pressure lock-out lever 220 against surface 229 of low pressure lever 42 so that when lever 42 is pushed to its upper position due to a decrease in pressure applied to low pressure bellows 38, lever 42 is locked into its upper position with edge 229 extending into slot 228.

Referring now to figures 7 and 9 the high pressure lock-out lever 222 is mounted by pin 244 on front surface 22 through aperture 245 shown in Figure 4. The free end 246 of spring 232 is secured in aperture 248 in front surface 22 of the casing as shown in Figure 4 and Figure 7.

In operation, when the pressure applied to high pressure bellows 40 is sufficiently high to cause high pressure lever 48 to move to its upper position to thereby cause rod 50 to open the contacts in microswitch 28, edge 236 of lever 48 engages with slot 234 of the high pressure lock-out lever 222 to hold the switch contacts of microswitch 28 in an open position until reset button 250 is pressed. Similarly when the pressure applied to low pressure bellows 38 decreases below the value required to open contacts in switch 30, slot 228 of low pressure lock-out lever 220 engages surface 229 on principal low pressure lever 42.

Another important feature of the lock-out levers is the means for adjusting the position of slots 228 and 234 which engage the low and high pressure levers respectively. According to the invention, levers 220 and 222 each have a section 257 of reduced width and a tab 258 with an elongated slot 259 for receiving a screw driver. By twisting the screw driver in slots 259, it is possible to accurately and readily adjust the position of slots 228 and 234 by bending the reduced section 257.

Referring now to Figure 21, a reset bar 252 is provided with two identical cam surfaces 254 and 256 which are in axial alignment. Bar 252 is inserted through slot 86 in front wall 22 and extends into slot 84 in rear wall 24 of casing 60 shown in Figure 4. When reset button 250 is pressed, bar 252 moves axially through slots 86 and 84 so that cam surfaces 254 or 256 engage whichever of the low pressure lock-out lever 220 and high pressure lock-out lever 222 is in operative position whereby that lever pivots about its respective mounting pin 238 or 244 which extends through aperture 224 or 230 respectively to thereby release the locked low pressure lever 42 or high pressure lever 48, or both in event both levers are locked.

One important feature of the present invention is that the reset button does not operate directly on the low pressure lever 42 or high pressure lever 48 to thereby close the open contacts in microswitches 28 or 30 as is customary in prior devices of this type. Instead, reset button 250 causes only the reset lock-out levers 220 and 222 to be retracted so that the low pressure lever 42 or high pressure lever 48 will return to the position determined by the existing pressures in the compressor system. Thus, the contacts in microswitches 28 and 30 will close and thereby turn on the compressor equipment only if the condition which causes the control to shut down the compressor has changed to a safe value. There is accordingly no danger that the compressor motor will be turned on again while the dangerous condition which caused the compressor to shut down still exists.

Referring now to Figures 22, 23 and 24, there is illustrated a slightly modified form of the control device of the present invention wherein only a single microswitch 260 is used. Microswitch 260 is of the same type as switches 28 and 30 and is actuated by a single push rod 262 shown in detail in Figure 24. Push rod 262 is described in detail below and is adapted to be used with the control device described above with only minor modifications. In view of the similarity of the control device of Figures 22 and 23 to the control device described in Figures 1–21, only the differences will be described.

The contacts in microswitch 260 which are normally closed must open when either the low pressure bellows 38 or high pressure bellows 40 are connected to pressures which exceed the value set by the low pressure range adjustment screw 53 or the high pressure range adjustment screw 172. Push rod 262 is adapted to rest with its lower end 264 against high pressure lever 48. Lower end 264 is preferably provided with an extension 265 of reduced diameter which fits into and extends through a small aperture in lever 48 so that it does not become displaced laterally from its desired position when it moves upwardly relative to high pressure lever 48.

Push rod 262 is also provided with a central section 266 having a shoulder 268 adapted to abut against the lower edge of a rectangular opening 270 in low pressure lever 42. As shown in Figure 7, the part of low pressure lever 42 containing opening 270 extends over to be directly above the opening in high pressure lever 48 which receives lower end 265 of push rod 262. Thus, in the embodiment shown in Figures 22 and 23 the single push rod 262 is so connected with the low pressure lever 42 and the high pressure lever 48 that it will move upwardly to open the switch contacts in microswitch 260 when either of the levers 42 or 48 moves to its upper position.

In this embodiment, aperture 270 is provided in the central portion of upper wall 70 of the casing shown in Figure 4. The diameter of aperture 270 should be sufficiently large to pass the enlarged central section 266 of push rod 262 for ease of assembly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A control unit for refrigeration apparatus, said control unit comprising a base, a high pressure bellows unit and a low pressure bellows unit mounted side by side on said base, a high pressure tube means and low pressure tube means connected to the respective high and low pressure bellows units through said base, a generally U-shaped casing on said base and enclosing said bellows units, electrical switch means on the outer side of said casing, push rod means extending through an aperture in said casing to actuate said electrical switch means, high pressure lever means mounted for pivotal movement on said casing for transmitting motion of said high pressure bellows unit to said push rod means, a range spring mounted between said high pressure lever means and said U-shaped casing to bias said lever means against said bellows unit, low pressure lever means mounted for pivotal movement on said casing for transmitting motion of said low pressure bellows unit to said push rod means, said low pressure lever means comprising a first lever and a second lever, said first lever being mounted for pivotal movement about a first pivot axis through said housing parallel to said base at one end of said first lever, a range spring mounted between said base and the other end of said first lever, said second lever being mounted for pivotal movement about a second pivot axis through said housing parallel to said base and spaced from said first pivot axis, rod means connecting one end of said second lever to the movable end of said low pressure bellows unit, and roller means journalled to said first lever and interconnecting said first and said second levers for unitary movement positioned between said pivot axes and said range spring.

2. A control unit for refrigeration apparatus, said control unit comprising a base, a high pressure bellows unit and a low pressure bellows unit mounted side by side on said base, a high pressure tube means and low pressure tube means connected to the respective high and low pressure bellows units through said base, a generally U-shaped casing on said base and enclosing said bellows units, electrical switch means on the outer side of said casing, push rod means extending through an aperture in said casing to actuate said electrical switch means, high pressure lever means mounted for pivotal movement on said casing for transmitting motion of said high pressure bellows unit to said push rod means, a range spring mounted between said high pressure lever means and said U-shaped casing to bias said lever means against said bellows unit, low pressure lever means mounted for pivotal movement on said casing for transmitting motion of said low pressure bellows unit to said push rod means, said low pressure lever means comprising a first lever and a second lever, said first lever being mounted for pivotal movement about a first pivot axis through said housing parallel to said base at one end of said first lever, a range spring mounted between said base and the other end of said first lever, said second lever being mounted for pivotal movement about a second pivot axis through said housing parallel to said base and spaced from said first pivot axis, rod means connecting one end of said second lever to the movable end of said low pressure bellows unit, and roller means journalled to said first lever and interconnecting said first and said second levers for unitary movement positioned between said pivot axes and said range spring, a high pressure lock-out lever and a low pressure lock-out lever mounted on opposite walls of said casing for pivotal movement at a position between said bellows units, spring means biasing said lock-out levers against one end of their respective high and low pressure lever means, said lock-out lever means being formed to engage said one end of said pressure lever means when the pressure in the respective bellows unit has caused the electrical switch means to actuate and hold said one end of pressure lever means in a locked position.

3. A control unit for refrigeration apparatus, said control unit comprising a base, a high pressure bellows unit and a low pressure bellows unit mounted side by side on said base, a high pressure tube means and low pressure tube means connected to the respective high and low pressure bellows units through said base, a generally U-shaped casing on said base and enclosing said bellows units, electrical switch means on the outer side of said casing, push rod means extending through an aperture in said casing to actuate said electrical switch means, high pressure lever means mounted for pivotal movement on said casing for transmitting motion of said high pressure bellows unit to said push rod means, a range spring mounted between said high pressure lever means and said U-shaped casing to bias said lever means against said bellows unit, low pressure lever means mounted for pivotal movement on said casing for transmitting motion of said low pressure bellows unit to said push rod means, said low pressure lever means comprising a first lever and a second lever, said first lever being mounted for pivotal movement about a first pivot axis through said housing parallel to said base at one end of said first lever, a range spring mounted between said base and the other end of said first lever, said second lever being mounted for pivotal movement about a second pivot axis through said housing parallel to said base and spaced from said first pivot axis, rod means connecting one end of said second lever to the movable end of said low pressure bellows unit, and roller means journalled to said first lever and interconnecting said first and said second levers for unitary movement positioned between said pivot axes and said range spring, a high pressure lock-out lever and a low pressure lock-out lever mounted on opposite walls of said casing for pivotal movement at a position between said bellows units, spring means biasing said lock-out levers against one end of their respective high and low pressure lever means, said lock-out lever means being formed to engage said one end of said pressure lever means when the pressure in the respective bellows unit has caused the electrical switch means to actuate and hold said one end of said pressure lever means in a locked position, and lock-out release means slidably mounted through said opposite walls of said casing for manually retracting said lock-out levers.

4. In a control unit having an expansible bellows for actuating an electrical switch having contacts for controlling application of electric power to a motor driven compressor; a housing rigidly supporting one end of said expansible bellows; lever means mounted for pivotal movement on said housing; cap means on the movable ends of said expansible bellows connected to said lever means to control the pivotal position of said lever means in accordance with the displacement of the movable end of said expansible bellows; a range spring mounted between said housing and said cap means to retain said cap on said expansible bellows and to bias said lever means toward the fixed end of said expansible bellows; a differential spring mounted between said housing and said lever means to provide an additional biasing force on said lever means; stop means associated with said differential spring to render said differential spring ineffective by preventing it from acting on said lever means when said lever means pivots beyond a neutral position in the direction to cause said electric switch contacts to open and to act on said lever means when said lever means pivots beyond said neutral position to influence the bellows pressure necessary to cause said electric switch contacts to close.

5. In a control apparatus actuated by a pressure responsive bellows unit mounted on a base of said apparatus and having lever means for transmitting movement of the free end of the bellows unit for actuating a snap acting switch having a given operating differential, means associated with said lever means for varying said operating differential comprising a threaded post journalled for rotation in said apparatus base, a nut carrying an indicator arm on said threaded post and adjustably movable by rotation of said post, a stanchion axially movable on said post, a spiral differential spring mounted on said post to be compressed between said nut and said stanchion, said stanchion including means which engage said lever means only when said lever means is in a position beyond an intermediate position toward a position which causes contacts in said snap acting switch to transfer after compressing said differential spring, and stop means restricting movement of said stanchion to permit said lever means to move free of said stanchion engaging means at other positions of said lever means.

6. In a control unit having an expansible bellows for actuating an electrical switch having contacts for controlling a compressor: a base rigidly supporting one end of said expansible bellows; lever means comprising a first lever and a second lever, said first lever being mounted for pivotal movement about a first pivot axis fixed relative to said base at one end of said first lever; a range spring mounted between said base and the other end of said first lever; said second lever being mounted for pivotal movement about a second pivot axis fixed relative to said base and spaced from said first pivot axis; means connecting one end of said second lever to the other end of said expansible bellows; a differential spring mounted between said base and the other end of said second lever; means interconnecting said first and said second levers for unitary movement positioned between said pivot axes and said range spring; and a switch actuating member connected between said other end of said second lever and said electrical switch.

7. In a control unit having an expansible bellows for actuating an electrical switch having contacts for controlling power to a motor-driven compressor: a housing including a base rigidly supporting one end of said expansible bellows; lever means comprising a first lever and a second lever; said first lever being mounted for pivotal movement about a first pivot axis through said housing parallel to said base at one end of said first lever; a range spring mounted between said base and the other end of said first lever; said second lever being mounted for pivotal movement about a second pivot axis through said housing parallel to said base and spaced from said first pivot axis; rod means connecting one end of said second lever to the other end of said expansible bellows; a differential spring mounted between said base and the other end of said second lever; roller means journalled to said first lever and interconnecting said first and said second levers for unitary movement positioned between said pivot axes and said range spring; and a switch actuating member connected between said other end of said second lever and said electrical switch.

8. In a control unit having an expansible bellows for actuating an electrical switch having contacts for controlling power to a motor-driven compressor: a housing including a base rigidly supporting one end of said expansible bellows; lever means comprising a first lever and a second lever; said first lever being mounted for pivotal movement about a first pivot axis through said housing parallel to said base at one end of said first lever; a range spring mounted between said base and the other end of said first lever; said second lever being mounted for pivotal movement about a second pivot axis through said housing parallel to said base and spaced from said first pivot axis; rod means connecting one end of said second lever to the other end of said expansible bellows; a differential spring mounted between said base and the other end of said second lever; stop means associated with said differential spring to render said differential spring ineffective by preventing it from acting on said second lever when said second lever pivots beyond an intermediate position in the direction to cause said electrical switch contacts to open and to act on said second lever when said second lever pivots beyond said intermediate position to influence the bellows pressure necessary to cause said electrical switch contacts to close; roller means journalled to said first lever and interconnecting said first and said second levers from unitary movement positioned between said pivot axes and said range spring; and a switch actuating member connected between said other end of said second lever and said electrical switch.

9. In a control unit for refrigeration apparatus having a pressure sensitive expansible chamber for actuating an electric switch having normally closed contacts for controlling application of electric power to a motor driven compressor through a pressure lever mounted for pivotal movement on the control unit housing, a lock-out lever mounted on said control unit housing for pivotal movement and having a recess for locking said pressure lever in a position to hold said switch contacts open, spring means urging said lock-out lever against said pressure lever, and means for releasing said pressure lever from said lock-out lever comprising a member mounted in said housing having cam means selectively engaging said lock-out lever to pivot said lock-out lever out of contact with said pressure lever.

10. In a control unit for refrigeration apparatus having high pressure and low pressure expansible chambers for actuating electric switching means having normally closed contacts for controlling application of electric power to a motor driven compressor through separate pressure levers each mounted for pivotal movement on control unit housing, a pair of lock-out levers, one for each of said pressure levers, mounted on said control unit housing for independent pivotal movement, each of said levers having a recess for locking its respective pressure lever in a position to hold said switch contacts open, spring means urging said lock-out levers against their respective pressure levers, and reset means slidably mounted in said housing for pivoting said lock-out levers out of contact with said pressure levers.

11. In a control unit for refrigeration apparatus having high pressure and low pressure expansible chambers for actuating electric switching means having normally closed contacts for controlling application of electric power to a motor driven compressor, through separate pressure levers each mounted for pivotal movement on the control unit housing, a pair of lock-out levers, one for each of said pressure levers, mounted on said control unit housing for independent pivotal movement, each of said levers having a recess for locking its respective pressure lever in a position to hold said switch contacts open, spring means urging said lock-out levers against their respective pressure levers, and reset means including a bar slidably mounted in said housing walls to move in a direction normal to the plane of movement of said lock-out levers and having spaced cam means at positions adjacent each lock-out lever for individually pivoting each of said lock-out levers from engagement with said pressure levers.

12. In a control device of the type having pressure sensitive means connected by a pressure control lever mounted for pivotal movement for controlling actuation of an electric switch, a housing having a bottom and side walls, said pressure sensitive means being mounted on said bottom and said pressure control lever being mounted for pivotal movement about an axis normal to said side walls, a lock-out lever mounted on said side walls for pivotal movement about an axis parallel to the axis for said pressure lever, a recess in said lock-out lever adapted to engage a movable section of said pressure lever, means biasing said lock-out lever against said pressure lever, said lock-out lever further having a central section of reduced dimensions intermediate between the pivot axis for said lock-out lever and said recess, and tab means adjacent said recess for cooperating with a tool to adjust the position of said recess.

13. The control device as defined in claim 12 wherein said tab means is slotted to receive a screw driver blade for adjusting the position of said recess.

References Cited in the file of this patent

UNITED STATES PATENTS

| | | |
|---|---|---|
| 1,477,216 | Faust | Dec. 11, 1923 |
| 2,040,181 | Mekelberg | May 12, 1936 |
| 2,255,667 | Judson | Sept. 9, 1941 |
| 2,385,356 | Gilman et al. | Sept. 25, 1945 |
| 2,453,861 | Rothwell | Nov. 16, 1948 |
| 2,521,247 | Newton | Sept. 5, 1950 |
| 2,529,785 | Persons | Nov. 14, 1950 |
| 2,620,413 | Johnson | Dec. 2, 1952 |
| 2,680,168 | Murphy | June 1, 1954 |
| 2,751,457 | Donaldson | June 19, 1956 |
| 2,773,147 | Judson | Dec. 4, 1956 |
| 2,808,484 | Beck et al. | Oct. 1, 1957 |

FOREIGN PATENTS

| | | |
|---|---|---|
| 533,169 | Great Britain | Feb. 7, 1941 |